United States Patent [19]
Kikuchi et al.

[11] Patent Number: 5,738,249
[45] Date of Patent: Apr. 14, 1998

[54] QUANTITATIVE POWDER FEEDER CAPABLE OF FEEDING POWDER BY FIXED AMOUNTS

[75] Inventors: Yoshiaki Kikuchi; Tomohiro Arase; Shotaro Matsuda; Ryoichi Yamamoto, all of Kuga-gun, Japan

[73] Assignee: Mitsui Petrochemical Industries, Ltd., Tokyo, Japan

[21] Appl. No.: 694,258

[22] Filed: Aug. 8, 1996

[30] Foreign Application Priority Data

Sep. 7, 1995 [JP] Japan .................. 7-230049

[51] Int. Cl.⁶ .................................................. G01F 11/10
[52] U.S. Cl. .................................... 222/148; 222/368
[58] Field of Search ............................ 222/148, 368

[56] References Cited

U.S. PATENT DOCUMENTS

| | | | |
|---|---|---|---|
| 3,633,797 | 1/1972 | Graff | 222/368 X |
| 3,910,428 | 10/1975 | Peterson, II | 222/148 X |
| 4,906,144 | 3/1990 | Matsueda . | |

FOREIGN PATENT DOCUMENTS 63-41372  10/1988  Japan .

*Primary Examiner*—Gregory L. Huson
*Attorney, Agent, or Firm*—Birch, Stewart, Kolasch & Birch, LLP

[57] ABSTRACT

A rotor 22 accommodated in a casing 26 has a circumferential surface sliding on the internal surface of the casing 26 in airtight condition. The casing 26 is provided with a powder feed part 27 positioned above the rotor and is provided with a powder drop part 30 positioned under the rotor. At least one quantity-measuring recessed part is formed in the slide surface of the rotor. In accordance with the rotation of the rotor, the quantity-measuring recessed part comes to communicate with the powder feed part, so that powder is fed from the powder feed part into the quantity-measuring recessed part. When the rotation is advanced, the quantity-measuring recessed part comes to communicate with the powder drop part, so that the powder drops from the quantity-measuring recessed part through the powder drop part into a high-pressure part 19 arranged thereunder. These members construct a quantitative powder feeder which, even when a pressure difference exists between the supply side and the supplied side, can effectively prevent the gas flow and pressure leak therebetween and can minimize the amount of carrier gas used for feeding powder.

7 Claims, 7 Drawing Sheets

QUANTITATIVE POWDER FEEDER CAPABLE OF FEEDING POWDER BY FIXED AMOUNTS

FIELD OF THE INVENTION

The present invention relates to a quantitative powder feeder capable of feeding powder by fixed amounts. More particularly, the present invention is concerned with a quantitative powder feeder having at least one quantity-measuring recessed part which, even when a pressure difference exists between the supply side and the supplied side, can effectively prevent the gas flow and pressure leak therebetween and can minimize the amount of carrier gas used for feeding powder.

BACKGROUND OF THE INVENTION

Quantitative powder feeders capable of feeding powder by fixed amounts are being employed in various fields. Such quantitative powder feeders include a generally known rotary valve which comprises a rotor having a plurality of blades radially mounted thereon. In this rotary valve, powder is fed between neighboring blades to thereby effect the feeding by fixed amounts. However, the rotary valve has a drawback in that, when the powder to be fed has low fluidity or is viscous, adhesion of the powder occurs between neighboring blades of the rotary valve to thereby deteriorate the capability of feeding powder by fixed amounts.

In the technology comprising continuously feeding a chemical substance into a pressure vessel and continuously withdrawing a formed compound, a catalyst (powdery) for promoting the chemical reaction of the fed chemical substance is occasionally fed by fixed amounts into the pressure vessel. In this technology, a conspicuous pressure difference exists between the outside as the feed side and the inside of the pressure vessel as the fed side. Providing the above rotary valve between the feed side and the fed side would cause a gas flow from the high pressure part to the low pressure part because of the pressure difference to thereby deteriorate in accuracy the capability of feeding powder by fixed amounts or would cause a pressure leak to thereby render it difficult to maintain the reaction conditions in the pressure vessel. Therefore, it has been impracticable to directly employ the above rotary valve as the quantitative powder feeder in the technology.

Further, a device capable of mixing powder with a liquid to thereby produce a slurry and feeding the slurry by means of a pump and a device capable of dispersing powder in a turbulent gas and feeding the dispersion by means of a blower are being commonly employed as the quantitative powder feeders. However, powder is likely to precipitate in a liquid or a gas, so that it is difficult to maintain a uniform mixing degree. Thus, the capability of feeding powder by fixed amounts is deteriorated, thereby causing the danger of feeding powder in excess.

For overcoming the drawbacks of the prior devices, a device enabling mechanical and highly quantitative feeding of powder per se without the mixing thereof in a liquid or a gas has been proposed (see Japanese Utility Model Publication No. 63(1988)-41372). This mechanical quantitative powder feeder is shown in FIG. 10. Referring to FIG. 10, in the quantitative powder feeder, a rotor 102 is accommodated in a casing 104 and slides with its circumferential surface held in continuous contact with an internal circular surface of the casing 104. The casing 104 is provided with a powder feed part 106 above the rotor 102, which powder feed part 106 communicates with a hopper 108. A conduit 110 for introducing carrier gas is provided at one side of the rotor 102. The rotor 102 has a quantity-measuring hole 112 which passes through the rotor 102 at a right angle to the axis of rotation thereof. When the quantity-measuring hole 112 becomes vertical by the rotation of the rotor 102, one end of the quantity-measuring hole 112 opens into the powder feed part 106 while the other end thereof is sealed. When the quantity-measuring hole 112 becomes horizontal, it causes the conduit 110 to communicate therethrough with a high pressure zone.

In this conventional quantitative powder feeder, powder charged in the hopper 108 is introduced in a given amount into the quantity-measuring hole 112 when the quantity-measuring hole 112 becomes vertical by the rotation of the rotor 102. When the rotation of the rotor 102 proceeds by an angle of 90°, the quantity-measuring hole 112 becomes horizontal, so that the conduit 110 is caused to communicate therethrough with the high pressure zone. In this state, a high-pressure carrier gas is blown from a carrier gas source 114, so that the powder is fed by the carrier gas into the high pressure zone.

Although feeding powder by fixed amounts can be attained by this device of FIG. 10, it has a drawback in that the powder must be fed in the horizontal direction by means of the high-pressure carrier gas, so that a large amount of carrier gas must be used to thereby cause enlargement of the quantitative powder feeder to be inevitable. Further, the use of this quantitative powder feeder in feeding of a catalyst into, for example, a vapor-phase polymerization apparatus encounters the problem that the amount of carrier gas suffers from large intermittent changes because of the catalyst measurement, so that it is difficult to maintain constant reaction conditions in the fed zone, i.e., the inside of the polymerization reactor with the result that conducting stable polymerization reaction is difficult.

OBJECT OF THE INVENTION

The present invention has been made with a view toward overcoming the above drawbacks of the prior art. The object of the present invention is to provide a quantitative powder feeder which, even when the powder is of low fluidity or highly adherent, can feed the powder in a highly quantitative manner without the need of using any carrier gas for powder supply or with the use of the minimum amount of carrier gas and which can effectively prevent any gas flow or pressure leak therethrough, so that the quantitative powder feeder can be suitably employed in the quantitative powder supply to be effected in the presence of a pressure difference between the feed side and the fed side, for example, in the quantitative powder supply from a low pressure zone to a high pressure zone.

SUMMARY OF THE INVENTION

The quantitative powder feeder of the present invention is one capable of feeding powder by fixed amounts, which comprises:

an operating shaft capable of rotating on its axis;

a rotor provided integrally with the operating shaft;

a casing having a rotor accommodating part adapted to accommodate the rotor, the rotor accommodating part being provided with an internal circular surface arranged in continuous contact with a circumferential surface of the rotor while permitting sliding rotation of the rotor;

a powder feed part provided in a position of the casing above the rotor, the powder feed part opening downwardly into the rotor accommodating part of the casing;

a powder drop part provided in a position of the casing under the rotor, the powder drop part opening upwardly into the rotor accommodating part; and at least one quantity-measuring recessed part formed in the circumferential surface of the rotor, the quantity-measuring recessed part being adapted to separately open into the powder feed part and the powder drop part in succession during the rotation of the rotor.

In the quantitative powder feeder of the present invention, the above casing may be provided with a carrier gas introducing passage which is adapted to communicate with the quantity-measuring recessed part while the quantity-measuring recessed part is opening into the powder drop part.

The quantitative powder feeder of the present invention may be provided with a cleaning gas introducing passage and a cleaning gas discharging passage which are adapted to communicate with the quantity-measuring recessed part while the quantity-measuring recessed part has passed the powder drop part but has not yet opened into the powder feed part.

Further, the quantitative powder feeder of the present invention may be provided with at least one of a pressure regulation passage which is adapted to communicate with the quantity-measuring recessed part while the quantity-measuring recessed part has passed the powder drop part but has not yet opened into the powder feed part and a pressure regulation passage which is adapted to communicate with the quantity-measuring recessed part while the quantity-measuring recessed part has passed the powder feed part but has not yet opened into the powder drop part.

In the quantitative powder feeder of the present invention, at least two quantity-measuring recessed parts arranged along a direction of rotation of the rotor may be formed in the circumferential surface of the rotor, the quantity-measuring recessed parts each having a substantially hemispherical or substantially semiellipsoidal form.

DETAILED DESCRIPTION OF THE INVENTION

Figure 1:
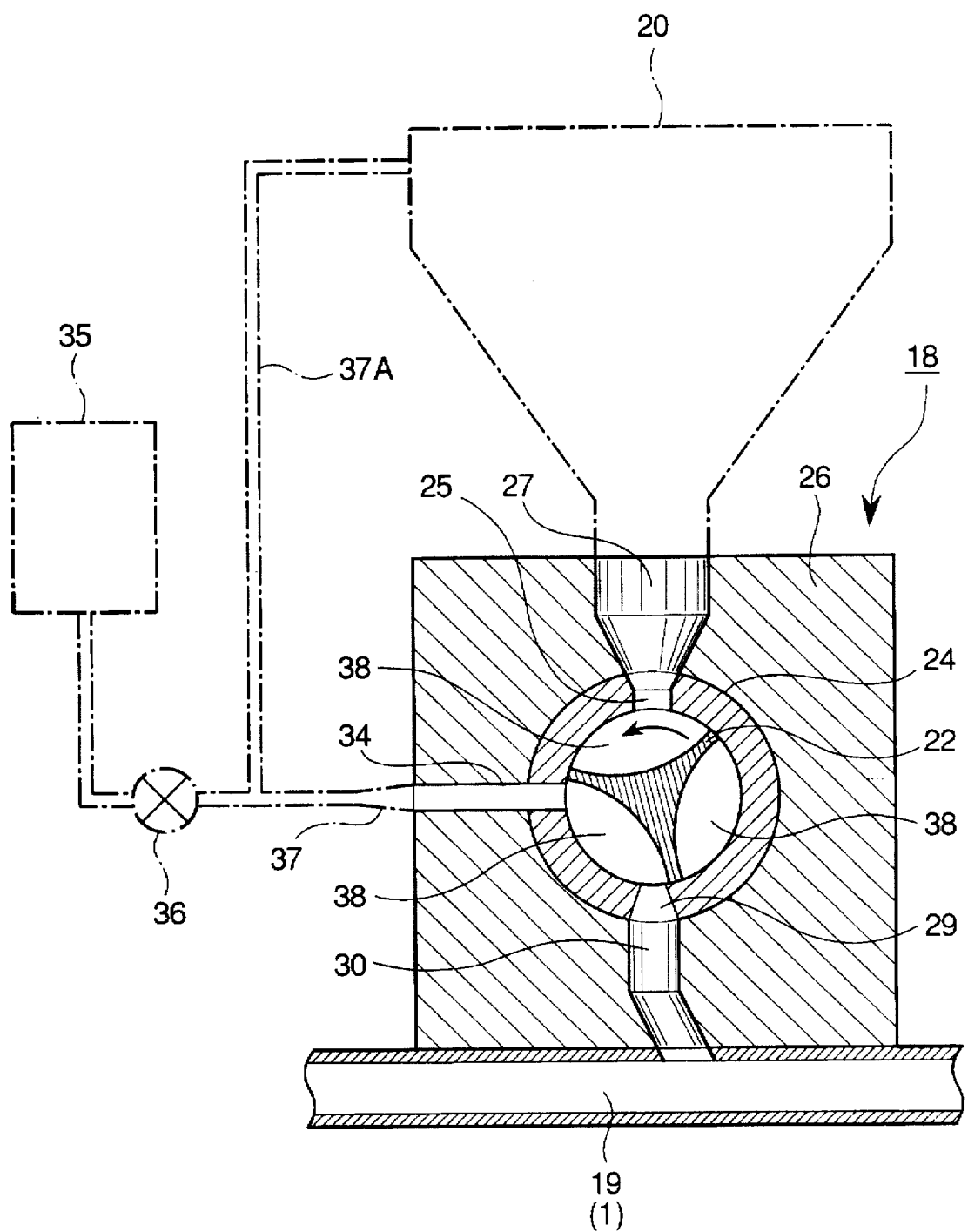
FIG. 1 is a transverse sectional view of one form of the quantitative powder feeder according to the present invention.

In the quantitative powder feeder of the present invention having the above structure, rotation of the operating shaft is accompanied by integral rotation of the rotor. The rotor slides with its circumferential surface held in continuous contact with the internal circular surface of the casing. The quantity-measuring recessed part formed in the circumferential surface of the rotor first communicates with the powder feed part positioned above the rotor, which powder feed part opens downwardly into the rotor accommodating part of the casing. This communication causes the powder to be fed from the powder feed part into the quantity-measuring recessed part. When the rotor is further rotated, the quantity-measuring recessed part passes the communication with the powder feed part and comes to communicate with the powder drop part positioned under the rotor, which powder drop part opens upwardly into the rotor accommodating part of the casing. This communication causes the powder held in the quantity-measuring recessed part to drop into the powder drop part. In the quantitative powder feeder according to the present invention, the area of sliding contact of the circumferential surface of the rotor with the internal circular surface of the rotor accommodating part can be set relatively large to thereby enable easily holding the airtightness, so that, even when the quantitative powder feeder is interposed between the supply side and the supplied side, any gas flow and pressure leak therethrough can effectively be prevented.

In the quantitative powder feeder of the present invention, the above carrier gas introducing passage can be provided so that carrier gas can be introduced into the quantity-measuring recessed part while the quantity-measuring recessed part is opening into the powder drop part, thereby enabling cleaning of the quantity-measuring recessed part and blowing down of any adhering powder. Thus, the drop of the powder can be accomplished more effectively.

In the quantitative powder feeder of the present invention, the above cleaning gas introducing passage and cleaning gas discharging passage can be provided so that, while the quantity-measuring recessed part is present between the powder drop part and the powder feed part, the atmospheric gas from the powder drop part which is remaining in the quantity-measuring recessed part can be replaced by the cleaning gas introduced through the cleaning gas introducing passage and discharged through the cleaning gas discharging passage.

Further, the quantitative powder feeder of the present invention can be provided with a pressure regulation passage which is adapted to communicate with the quantity-measuring recessed part while the quantity-measuring recessed part has passed the powder feed part but has not yet opened into the powder drop part or a pressure regulation passage which is adapted to communicate with the quantity-measuring recessed part while the quantity-measuring recessed part has passed the powder drop part but has not yet opened into the powder feed part, thereby enabling strictly avoiding the mutual influence between the powder feed part and the powder drop part attributed to a pressure difference therebetween.

Still further, in the quantitative powder feeder of the present invention, at least two quantity-measuring recessed parts can be formed in the circumferential surface of the rotor, so that the powder can be fed a plurality of times by one rotation of the rotor. Moreover, each quantity-measuring recessed part can be formed into a substantially hemispherical or substantially semiellipsoidal form, so that the powder can be dropped more smoothly without any loss of the blowout energy of carrier gas introduced in the quantity-measuring recessed part.

EFFECT OF THE INVENTION

As apparent from the foregoing and the below described embodiments of the invention, in the quantitative powder feeder of the present invention, the powder introduced in the quantity-measuring recessed part of the rotor is fed due to gravitational drop into the powder drop part by the rotation of the rotor. Even when the powder drop part has a high pressure, the drop of the powder is not blocked. Therefore, the powder feed can be attained without the need of using carrier gas. Moreover, the area of sliding contact of the circumferential surface of the rotor with the internal circular surface of the rotor accommodating part can be set relatively large to thereby enable easily holding the airtightness, so that, even when the quantitative powder feeder is interposed between the supply side and the supplied side, any gas flow and pressure leak therethrough can effectively be prevented.

In the quantitative powder feeder of the present invention, the above carrier gas introducing passage can be provided so that carrier gas can be introduced into the quantity-measuring recessed part while the quantity-measuring recessed part is opening into the powder drop part, thereby enabling cleaning of the quantity-measuring recessed part and blowing down of any adhering powder. Thus, the drop of the powder can be accomplished more smoothly. This quantitative powder feeder is especially suitable for use in feeding powder of low fluidity or high adherence, powder whose adherence is increased because of reaction with the atmospheric gas or moisture absorption at the feed side and the fed side and powdery catalysts and the like whose feed quantity dispersion has a grave influence on the productivity and product quality.

In the quantitative powder feeder of the present invention, the above cleaning gas introducing passage and cleaning gas discharging passage can be provided so that, while the quantity-measuring recessed part is present between the powder drop part and the powder feed part, the atmospheric gas from the powder drop part which is remaining in the quantity-measuring recessed part can be replaced by the cleaning gas introduced through the cleaning gas introducing passage and discharged through the cleaning gas discharging passage.

Further, the quantitative powder feeder of the present invention can be provided with a pressure regulation passage which is adapted to communicate with the quantity-measuring recessed part while the quantity-measuring recessed part has passed the powder feed part but has not yet opened into the powder drop part or a pressure regulation passage which is adapted to communicate with the quantity-measuring recessed part while the quantity-measuring recessed part has passed the powder drop part but has not yet opened into the powder feed part, thereby enabling strictly avoiding the mutual influence between the powder feed part and the powder drop part attributed to a pressure difference therebetween.

Still further, in the quantitative powder feeder of the present invention, at least two quantity-measuring recessed parts can be formed in the circumferential surface of the rotor, so that the powder can be fed a plurality of times by one rotation of the rotor. Moreover, each quantity-measuring recessed part can be formed into a substantially hemispherical or substantially semiellipsoidal form, so that the powder can be dropped more smoothly without any loss of the blowout energy of carrier gas introduced in the quantity-measuring recessed part.

Therefore, the present invention not only enables miniaturization of the feeder but also, in the application to, for example, feed of a catalyst into a vapor-phase polymerization apparatus, facilitates maintenance of constant reaction conditions in the fed side, i.e., the inside of the polymerization reactor, because no carrier gas is needed at all or, if needed, the amount thereof can be minimized in the catalyst measurement, with the result that stable polymerization reaction can be performed.

PREFERRED EMBODIMENT OF THE INVENTION

One embodiment of the present invention will be described below with reference to FIGS. 1 to 3.

Figure 2:
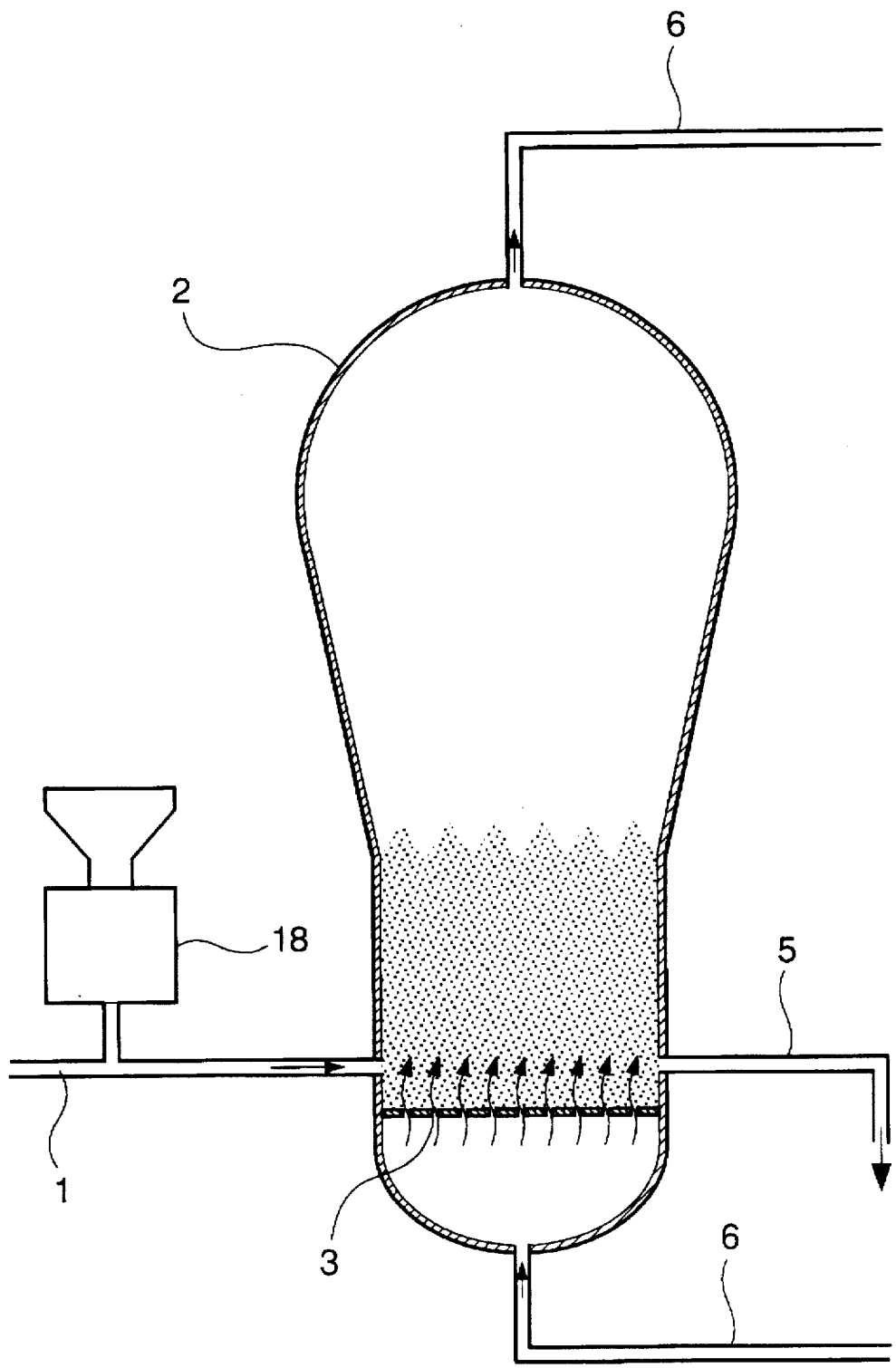
FIG. 2 is an entire schematic diagram of a circuit apparatus provided with the quantitative powder feeder of FIG. 1.

FIG. 2 shows the entirety of a device circuit employed in the vapor-phase olefin polymerization in which the quantitative powder feeder of this Embodiment is arranged. The outline of this device circuit will first be described below.

The vapor-phase polymerization of an olefin is carried out in a vapor-phase polymerizer 2 as a pressure vessel for chemical reaction. That is, the olefin is vapor-phase homopolymerized or copolymerized in the vapor-phase polymerizer 2 in the presence of a powdery solid catalyst which is held in a fluid state by a gas containing a gaseous nonpolymerizable hydrocarbon having low boiling point, the olefin and hydrogen, with a formed polyolefin continuously withdrawn from the polymerizer 2.

Specifically, for example, raw gases such as an olefin and hydrogen and the above powdery solid catalyst consisting of a solid catalyst component and an organometallic compound catalyst component, according to necessity, together with an electron donor are fed through a line 1 into a reactive fluid bed 4 within the vapor-phase polymerizer 2. The reactive fluid bed 4 is held in a fluid state by the flow of a gas (for example, nonpolymerizable hydrocarbon having low boiling point) continuously supplied through a dispersion plate 3. The polymerization is continuously performed while withdrawing a polymer formed in the reactive fluid bed 4 through a line 5.

The quantitative powder feeder 18 of this embodiment is provided on the above line 1 of this circuit apparatus for feeding powder such as the above powdery solid catalyst.

Figure 3:
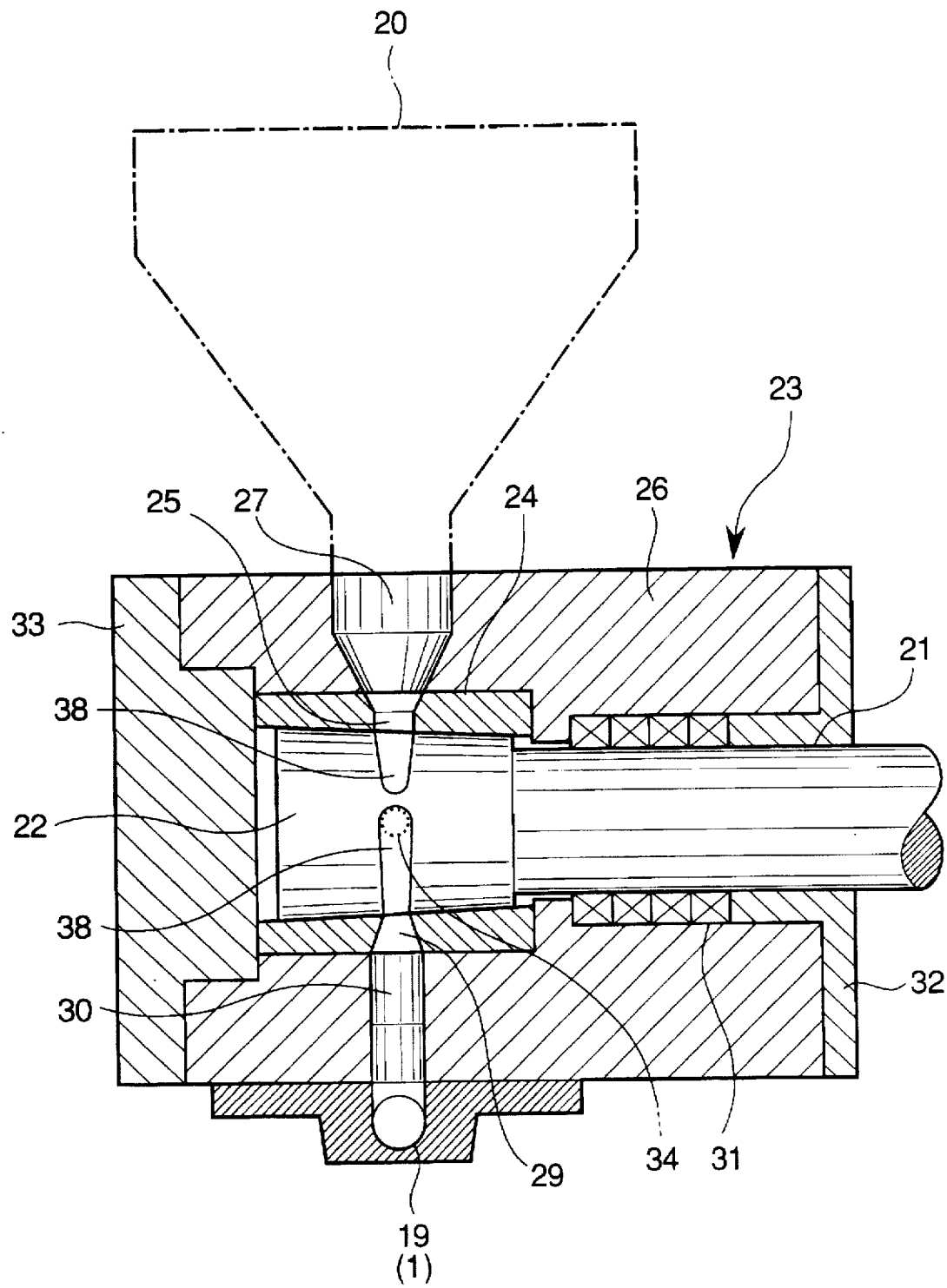
FIG. 3 is a vertical sectional view corresponding to FIG. 1.

An enlarged view of this quantitative powder feeder 18 is given in FIGS. 1 and 3. As shown, the quantitative powder feeder 18 is provided with a casing body 26, an operating shaft 21 accommodated in the casing body 26 and a rotor 22 integrally combined with the operating shaft 21. A hopper 20 for supplying the powdery solid catalyst and a feed pipe 19 constituting the line 1 arranged above and under the rotor 22, respectively, are connected to the casing body 26.

The feed pipe 19 is connected to the vapor-phase polymerizer 2 as a high-pressure vessel, so that it is a high-pressure zone. In this embodiment, the feed pipe 19 feeds raw gases such as hydrogen and the olefin into the vapor-phase polymerizer 2, so that the gases continuously flow through the feed pipe 19. On the other hand, the pressure level in the hopper 20, in which power is charged, is low close to the atmospheric pressure. The powdery solid catalyst may be carried into the polymerizer with the use of an inert gas such as $N_2$ or Ar.

The head (left end portion in FIG. 3) of the operating shaft 21 is integrally provided with a rotor 22 formed into a truncated cone. The operating shaft 21 and the rotor 22 are jointly accommodated in the casing 23. The rotor 22 has its diameter decreased toward the front edge. A sleeve 24 composing part of the casing 23 is arranged around the rotor 22 so that they contact each other. The rotor 22 can airtightly slide, namely, can rotate in continuous contact with the internal circular surface of the sleeve 24. Although the material for forming the sleeve 24 is not particularly limited and it may be one conventionally employed in sleeves for accommodating rotors, for example, a metal, it is preferred that the sleeve 24 be composed of a plastic such as Teflon (tetrafluoroethylene), polyethylene or Luron (polyamide) in view of the advantage that a small clearance is permitted.

A feed hole 25 is provided in the sleeve 24 above the rotor 22 and is connected to a powder feed part 27 formed in the casing body 26. The powder feed part 27 is connected to the hopper 20 disposed above the casing body 26.

A drop hole 29 is provided in the sleeve 24 under the rotor 22 and is connected to a powder drop part 30 provided thereunder in the casing body 26. The powder drop part 30 is connected to the feed pipe 19 arranged thereunder at its opening.

Referring to FIG. 3, the operating shaft 21 is supported by a bearing (not shown) disposed at the right side of the casing body 26. Shaft sealing means composed of a gland packing 31 and a gland 32 prevents the leak of gas from the shaft part.

The casing body 26 is sealed by a cover 33 at the front edge side (left side of FIG. 3) of the rotor 22. This cover 33 is fixed on the casing body 26 by means of bolts not shown.

A carrier gas introducing passage 34 having one end opening into the inside of the sleeve is provided at one side (left side in FIG. 1) of the rotor. The other end of the carrier gas introducing passage 34 is connected to a carrier gas blow pipe 37, which is connected through an on-off valve 36 to a carrier gas source 35. The carrier gas blow pipe 37 is provided with a branch pipe 37A and the branch pipe 37A is connected to the hopper 20. The carrier gas introducing passage 34 is formed in such a position that it communicates with a quantity-measuring recessed part 38 (described later) while the quantity-measuring recessed part 38 is communicating with the powder drop part 30.

Three quantity-measuring recessed parts 38 are formed in the slide surface of the rotor 22. Each quantity-measuring recessed part 38 has a curved surface which constitutes part of a substantially semiellipsoidal profile in a section perpendicular to the axis of the rotor 22 as shown in FIG. 1. Each quantity-measuring recessed part 38 has in the circumferential direction a length such that the quantity-measuring recessed part 38 can communicate with both of the opening of the powder drop part 30 and the opening of the carrier gas introducing passage 34 (see FIG. 1).

The operation of this embodiment will be described below. The powder charged into the hopper 20 passes through the powder feed part 27 and the feed hole 25 into the quantity-measuring recessed part 38. The quantity-measuring recessed part 38 has a volume of predetermined size, so that a predetermined amount of the powder is introduced in the quantity-measuring recessed part 38. The operating shaft 21 and the rotor 22 always rotate in the same direction (counterclockwise in FIG. 1).

The quantity-measuring recessed part 38 filled with the powder terminates the communication with the powder feed part 27 and is advanced to open into the powder drop part 30 by the rotation of the rotor 22. This opening causes the powder charged in the quantity-measuring recessed part 38 to drop through the drop hole 29 and the powder drop part 30 into the feed pipe 19. This drop can be effected by the gravity exerted on the powder. In this instance, the pressure difference between the powder feed part 27 as a low-pressure zone and the powder drop part 30 as a high-pressure zone is stably maintained because an excellent airtightness is ensured between the internal circular surface set relatively large of the sleeve 24 and the circumferential surface of the rotor 22 which is brought into sliding contact with the above internal circular surface. Further, the quantity-measuring recessed part 38 having opened into the powder drop part 30 already has a high pressure thereinside, so that the high pressure of the powder drop part 30 does not block the drop of the powder. Therefore, unless, for example, static electricity causes powder to remain inside the quantity-measuring recessed part 38, the feed can be accomplished without the need of using the carrier gas or the like.

When the rotor 22 is further rotated, the quantity-measuring recessed part 38 soon comes to communicate with the carrier gas introducing passage 34 while maintaining the communication with the powder drop part 30. In this state, supply of carrier gas through the on-off valve 36 from the carrier gas source 35 causes the powder remaining in the quantity-measuring recessed part 38 to be pushed to flow by the fluid energy of the carrier gas, so that the above drop can be executed more smoothly.

The quantity-measuring recessed part 38 having emptied by the drop of all the powder returns to a position in which the quantity-measuring recessed part 38 opens into the powder feed part 27 by a further rotation of the rotor 22.

In this embodiment, for example, counterclockwise continuous rotation of the rotor 22 enables interrupted continuous feeding of the powder three times per rotation of the rotor 22. The speed and direction of rotation of the rotor 22 can be held unchanged but either one or both thereof can be changed at desired feed time intervals.

Figure 10:
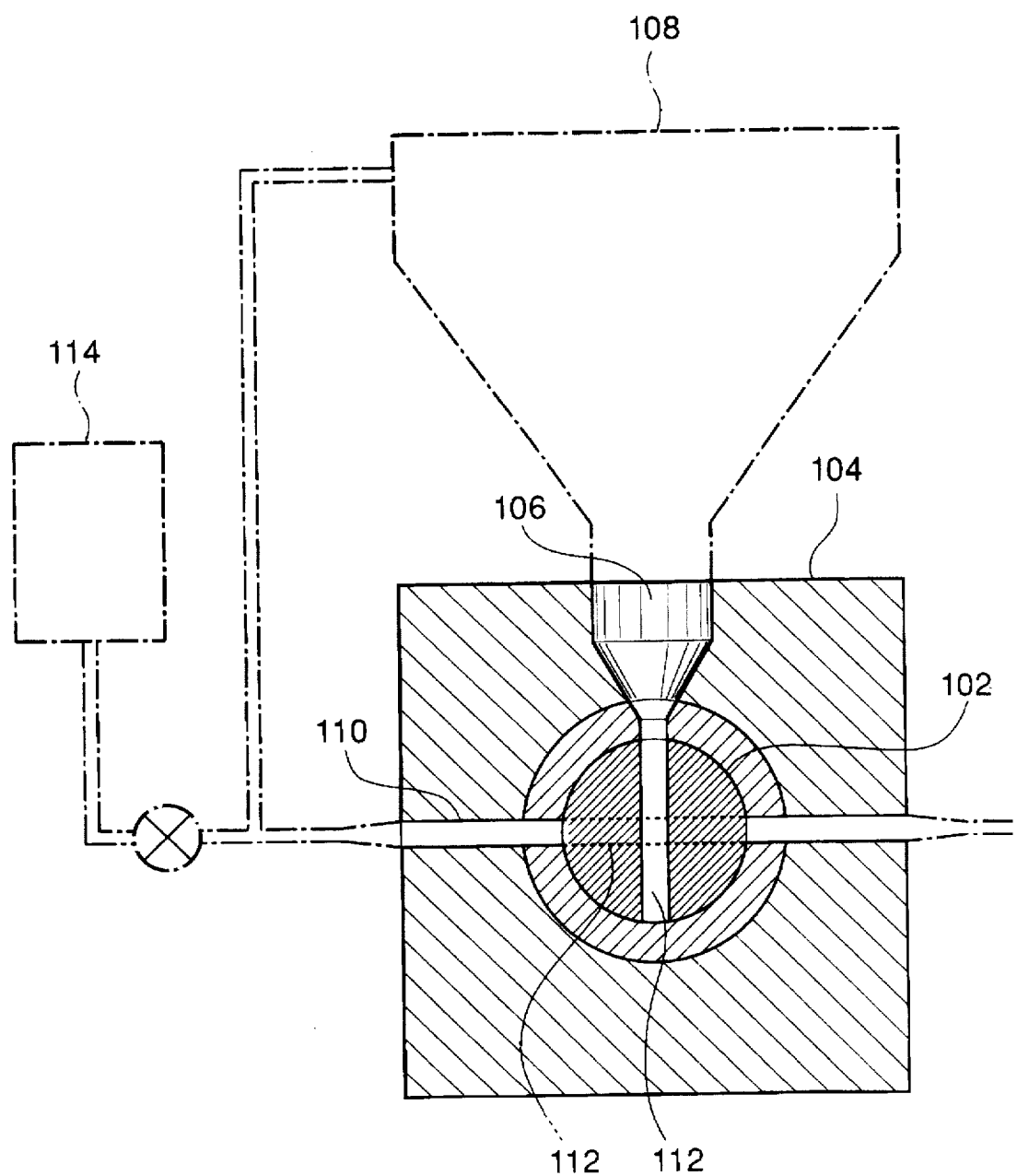
FIG. 10 is a transverse sectional view showing the prior art.

As apparent from the above, in this embodiment, the powder charged in the quantity-measuring recessed part 38 drops through the drop hole 29 and the powder drop part 30 into the feed pipe 19 even if the pressure therein is high by the gravity exerted on the powder itself. Therefore, the feeding of powder can basically be conducted without the need of using carrier gas as different from the prior art (FIG. 10).

When the powder is likely to remain in the quantity-measuring recessed part 38 because of static electricity, etc., the use of carrier gas is effective. However, the amount of carrier gas can be as small as that sufficient to pass through a short path consisting of the quantity-measuring recessed part 38 and the powder drop part 30, so that a large volume of carrier gas is not needed as different from the prior art.

Moreover, the carrier gas flows along the substantially semiellipsoidal surface of the quantity-measuring recessed part 38 during the passing therethrough, so that loss of the flow energy of the carrier gas can be minimized. Therefore, the amount of carrier gas can be further smaller.

The pressure of the carrier gas also applies through the branch pipe 37A to the inside of the hopper 20, so that the disadvantage can be avoided that the carrier gas contraflows into the hopper 20 because of, for example, incomplete airtightness between the internal circular surface of the casing body 26 and the circumferential surface of the rotor 22 to thereby blow up the powder in the hopper 20.

Although the present invention has been described in terms of the embodiment using the quantitative powder feeder as the powdery solid catalyst feeder in the olefin vapor-phase polymerization apparatus, it should be understood that the present invention is not limited thereto and various modifications can be made without departing from the scope of technical concept of the described invention.

Figure 4:
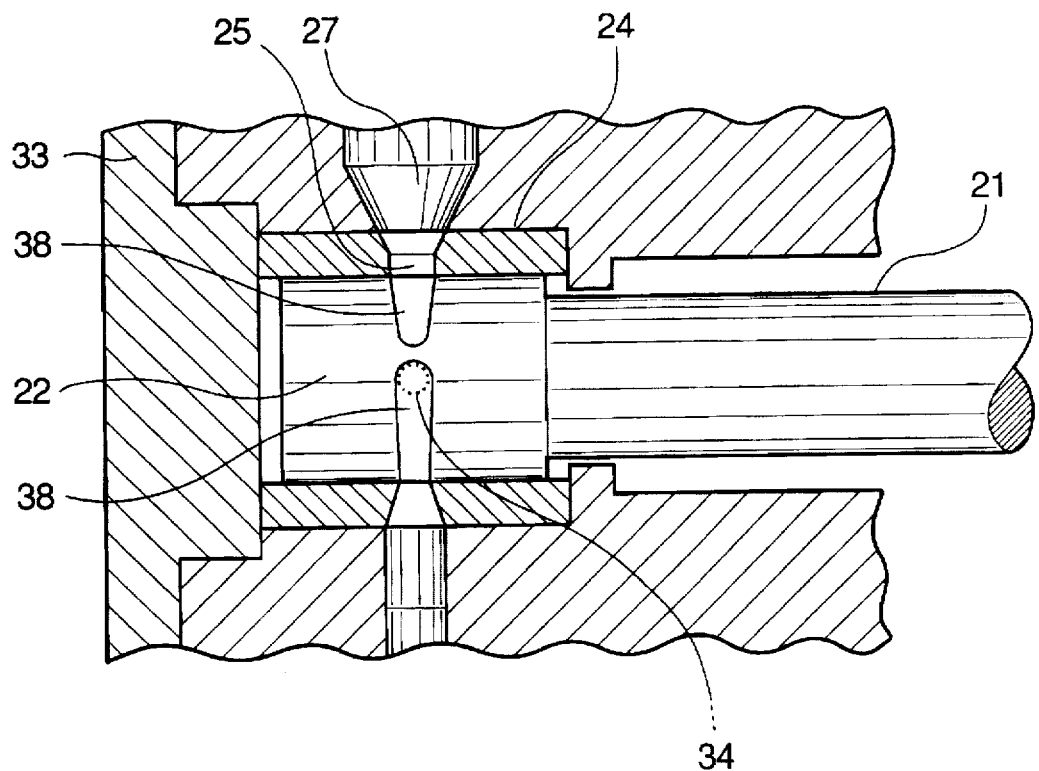
FIG. 4 is a vertical sectional view showing essential parts of a second form of the quantitative powder feeder according to the present invention.

That is, in the quantitative powder feeder of the present invention, the shape of the rotor is not particularly limited and any shape may be employed as long as use is made of a rotating member. Therefore, for example, the quantitative powder feeder of the present invention may be provided with a cylindrical rotor 22 as shown in FIG. 4 as the second embodiment. Further, the shape of the rotor 22 may be spherical or ellipsoidal although not shown.

Although three quantity-measuring recessed parts 38 were formed in the slide surface of the rotor 22 along the direction of rotation thereof in the described embodiment, the number, positions of formation and shapes of quantity-measuring recessed parts are not particularly limited in the present invention as long as they are not detrimental to the functions to be attained in the present invention. Therefore, for example, the quantitative powder feeder of the present invention may be provided with two quantity-measuring recessed parts 38 as shown in FIG. 5 as the third embodiment.

Figure 5:
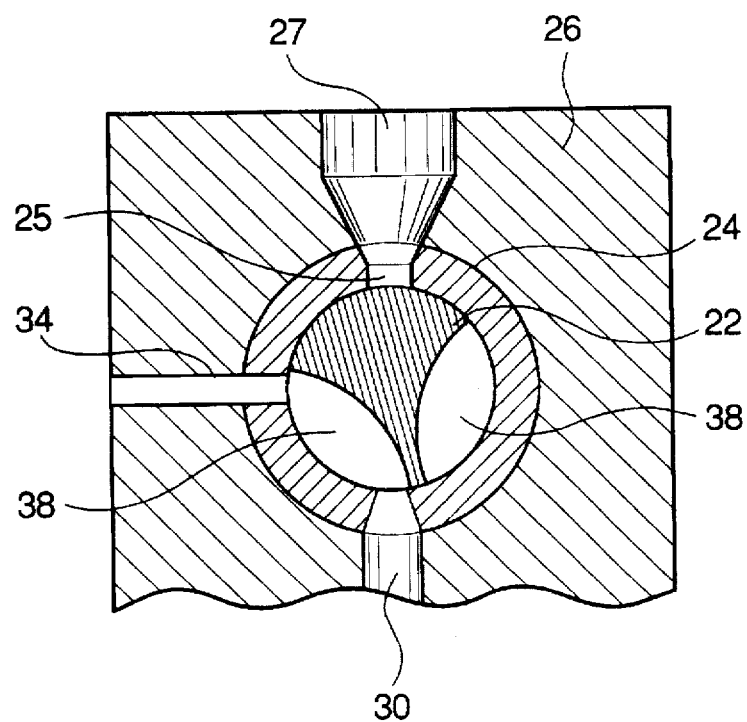
FIG. 5 is a transverse sectional view showing essential parts of a third form of the quantitative powder feeder according to the present invention.
Figure 6:
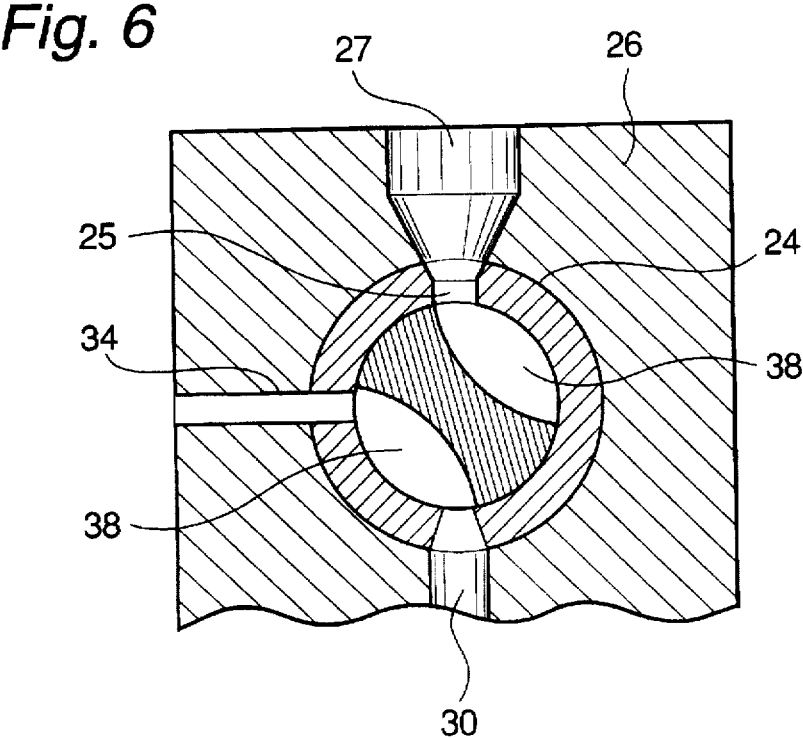
FIG. 6 is a transverse sectional view showing essential parts of a fourth form of the quantitative powder feeder according to the present invention.

The above two quantity-measuring recessed parts 38 may be arranged either at deviated intervals as shown in FIG. 5 or at equal intervals as shown in FIG. 6 as the third embodiment along the direction of rotation (i.e., along the circumferential direction) of the rotor 22.

Figure 7:
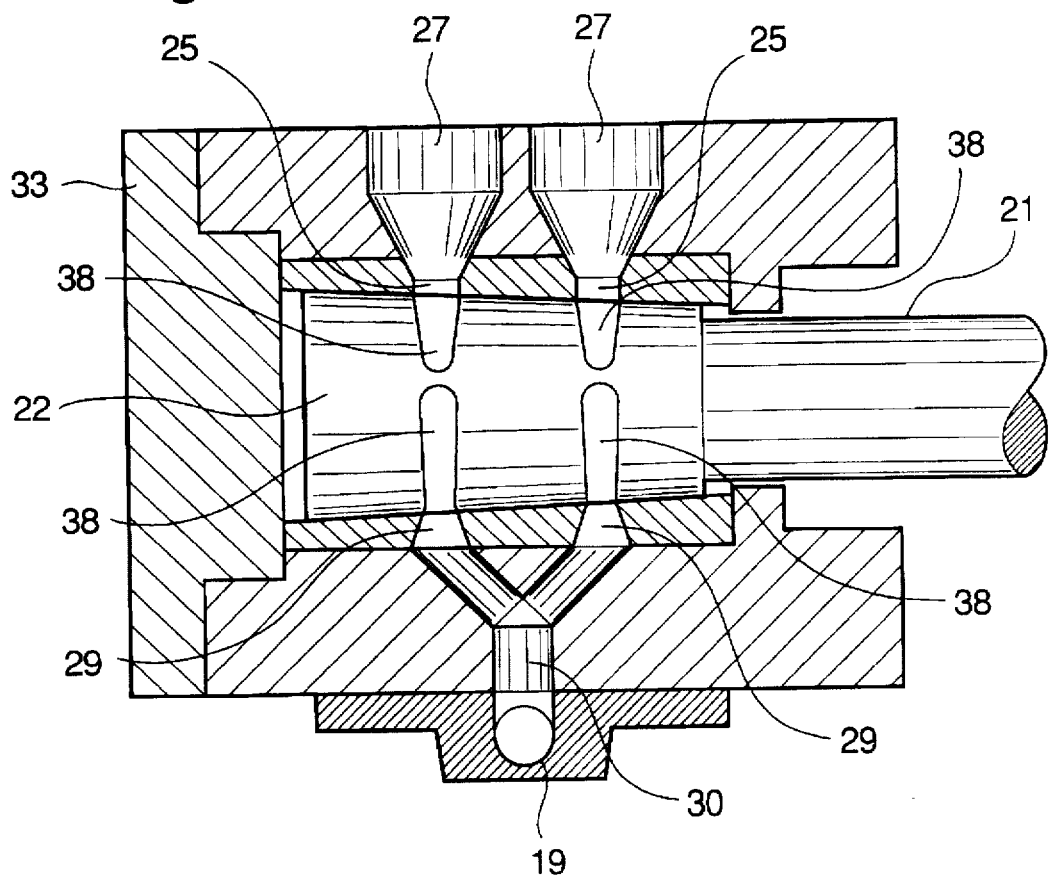
FIG. 7 is a vertical sectional view showing a fifth form of the quantitative powder feeder according to the present invention.

In the above embodiments, only one row of quantity-measuring recessed parts 38 were arranged along the axial direction of the rotor 22 although a plurality of quantity-measuring recessed parts 38 were formed along the direction of rotation of the rotor 22. However, at least two rows of quantity-measuring recessed parts 38 can be provided along the axial direction of the rotor 22 as in the fifth embodiment shown in FIG. 7. In this case, a plurality of powder feed parts 27 and feed holes 25 are provided for communication with the quantity-measuring recessed parts 38. Also, a plurality of drop holes 29 are provided. These drop holes 29 may be combined to open into a single Y-shaped powder drop part 30 (see FIG. 7). Alternatively, in another embodiment not shown, a plurality of powder drop parts 30 may be provided and arranged in mutually twisted relationship so as to be connected to a single feed pipe 19.

Although the inner curved surface of the quantity-measuring recessed part 38 was substantially semiellipsoidal in the above embodiments, it can be substantially hemispherical in another embodiment. Also, other forms of curved surfaces can be employed as long as loss of the energy of carrier gas can be suppressed.

Although two or three quantity-measuring recessed parts 38 were provided in the above embodiments, the number of quantity-measuring recessed parts 38 can be one or at least four in other embodiments not shown.

Figure 8:
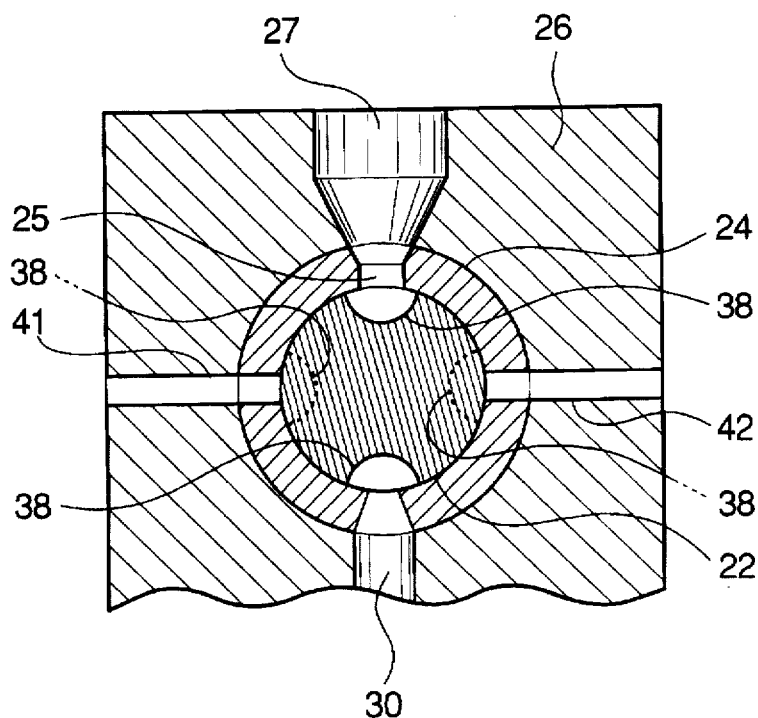
FIG. 8 is a transverse sectional view showing essential parts of a sixth form of the quantitative powder feeder according to the present invention.
Figure 9:
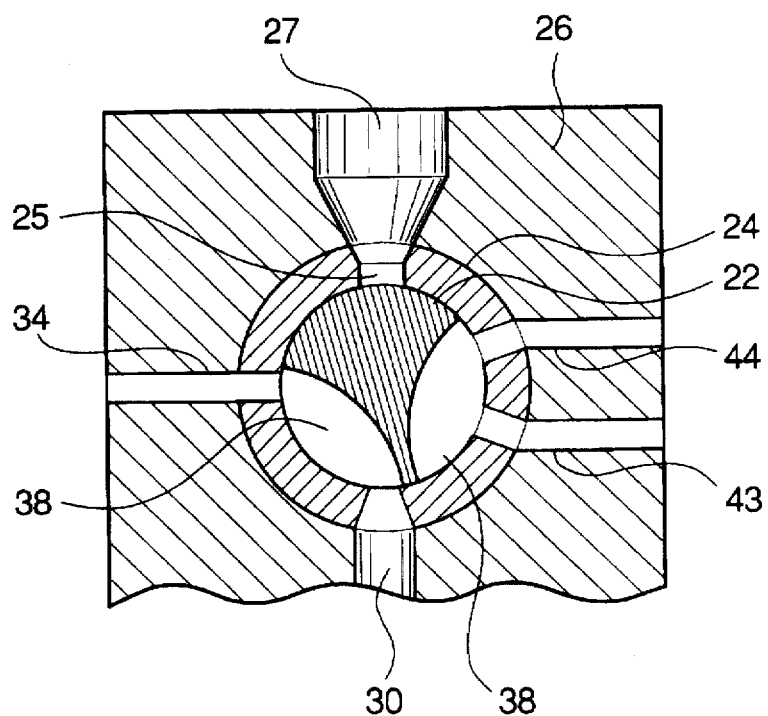
FIG. 9 is a vertical sectional view showing a seventh form of the quantitative powder feeder according to the present invention.

In the present invention, other forms of quantitative powder feeders shown in FIGS. 8 and 9 can be employed for strictly effecting the prevention of pressure leak or gas flow between the powder feed part and the powder drop part.

In the embodiment shown in FIG. 8, two quantity-measuring recessed parts 38 having a center of symmetry at the axis of rotation of the rotor 22 were formed in the surface of the rotor 22 brought in sliding contact with the sleeve 24. When one of the quantity-measuring recessed parts 38 opens into the powder feed part 27, the other quantity-measuring recessed part 38 opens into the drop part 30.

A pressurized-side pressure regulation passage 41 having one end adapted to open into the inside of the sleeve is provided at one side (left side in FIG. 8) of the rotor 22. The other end of the pressure regulation passage 41 is connected to a pressurizer not shown so as to cause the pressure regulation passage 41 to continuously have the same gas pressure as in the drop part 30. A vacuum-side pressure regulation passage 42 having one end adapted to open into the inside of the sleeve is provided at the other side (right side in FIG. 8) of the rotor 22. The other end of the pressure regulation passage 42 is connected to a gas aspirator not shown so as to cause the pressure regulation passage 42 to continuously have the same gas pressure as in the powder feed part 27. These pressure regulation passages 41, 42 are provided in positions such that they communicate with the quantity-measuring recessed part 38 having passed the powder feed part 27 and that having passed the drop part 30, respectively, in the counterclockwise rotation of the rotor 22.

In the quantitative powder feeder of the above structure, the pressurized-side pressure regulation passage 41 opens into the quantity-measuring recessed part 38 having passed the powder feed part 27 by the rotation of the rotor 22, so that the inside of the quantity-measuring recessed part 38 is pressurized to thereby have the same pressure as in the drop part 30 with the result that the high pressure of the drop part 30 can be stably maintained. On the other hand, the vacuum-side pressure regulation passage 42 opens into the quantity-measuring recessed part 38 having passed the powder drop part 30, so that high-pressure gas is caused to escape outside from the inside of the quantity-measuring recessed part 38 to thereby reduce the pressure of the quantity-measuring recessed part 38 with the result that not only is the high pressure of the powder drop part 30 not detrimental to the powder feed part 27 but also the flow of the atmospheric gas of the drop part 30 into the powder feed part 27 can be reduced. When the high-pressure gas discharged outside through the vacuum-side pressure regulation passage 42 and the aspirator must have some treatment, it would be appropriate to connect a suctioned gas treating device with specified functions to the aspirator.

In the embodiment shown in FIG. 9, two quantity-measuring recessed parts 38 arranged at deviated intervals along the direction of rotation (i.e., along the circumferential direction) of the rotor 22 were formed in the surface of the rotor 22 brought into sliding contact with the sleeve 24.

The same carrier gas introducing passage 34 as in the first embodiment is provided at one side (left side in FIG. 9) of the rotor 22, and a cleaning gas introducing passage 43 and a cleaning gas discharging passage 44 each having one end adapted to open into the inside of the sleeve are provided at the other side (right side in FIG. 9) of the rotor 22. The other end of the cleaning gas introducing passage 43 is connected through a valve, etc. to a cleaning gas source not shown. The other end of the cleaning gas discharging passage 44 is connected to a gas aspirator not shown. These cleaning gas introducing passage 43 and cleaning gas discharging passage 44 are arranged in positions such that they simultaneously open into the quantity-measuring recessed part 38 having passed the drop part 30 and communicate with each other through the quantity-measuring recessed part 38 in the counterclockwise rotation of the rotor 22.

In the quantitative powder feeder of the above structure, first, the cleaning gas introducing passage 43 opens into the quantity-measuring recessed part 38 having passed the powder drop part 30 by the rotation of the rotor 22. Further advance of the rotation of the rotor 22 causes the cleaning gas discharging passage 44 to also open thereinto. In this instance, causing cleaning gas to flow through the cleaning gas introducing passage 43 into the quantity-measuring recessed part 38 and to be discharged through the cleaning gas discharging passage 44 enables replacing the atmospheric gas of the powder drop part 30 which is remaining in the quantity-measuring recessed part 38 by cleaning gas. The cleaning gas discharging passage 44 is held open for some time after the sealing of the cleaning gas introducing passage 43 resulting from further advance of the rotation of the rotor 22 to thereby also function as the above vacuum-side pressure regulation passage.

FIGS. 4 to 9 employ the same numerals for denoting the same parts as in FIGS. 1 to 3, and repeated descriptions have been omitted.

Although the foregoing has described the embodiments in which the present invention has been applied to the apparatus for quantitatively feeding a powdery solid catalyst to an olefin vapor-phase polymerizer, it should naturally be understood that the present invention can be advantageously applied by virtue of its excellent quantity-measuring capability and/or air-tightness maintaining capability to various fields not limited to those in which there is a pressure difference between the feed side and the fed side and including, for example, those in which there is no pressure difference or those in which it is needed to prevent any gas flow between the feed side and the fed side.

What is claimed is:

1. A quantitative powder feeder capable of feeding powder by fixed amounts, which comprises:

an operating shaft capable of rotating on its axis;

a rotor provided integrally with the operating shaft;

a casing having a rotor accommodating part adapted to accommodate the rotor, said rotor accommodating part being provided with an internal circular surface arranged in continuous contact with a circumferential surface of the rotor while permitting sliding rotation of the rotor;

a powder feed part provided in a position of the casing above the rotor, said powder feed part opening downwardly into the rotor accommodating part of the casing;

a powder drop part provided in a position of the casing under the rotor, said powder drop part opening upwardly into the rotor accommodating part; and at least one quantity-measuring recessed part formed in the circumferential surface of the rotor, said quantity-measuring recessed part being adapted to separately open into the powder feed part and the powder drop part in succession during the rotation of the rotor, wherein a carrier gas introducing passage is provided which is adapted to communicate with the quantity-measuring recessed part while the quantity-measuring recessed part is opening into the powder drop part.

2. The quantitative powder feeder according to claim 1, wherein a cleaning gas introducing passage and a cleaning gas discharging passage are provided which are adapted to communicate with the quantity-measuring recessed part while the quantity-measuring recessed part has passed the powder drop part but has not yet opened into the powder feed part.

3. A quantitative powder feeder capable of feeding powder by fixed amounts, which comprises:

an operating shaft capable of rotating on its axis;

a rotor provided integrally with the operating shaft;

a casing having a rotor accommodating part adapted to accommodate the rotor, said rotor accommodating part being provided with an internal circular surface arranged in continuous contact with a circumferential surface of the rotor while permitting sliding rotation of the rotor;

a powder feed part provided in a position of the casing above the rotor, said powder feed part opening downwardly into the rotor accommodating part of the casing;

a powder drop part provided in a position of the casing under the rotor, said powder drop part opening upwardly into the rotor accommodating part; and at least one quantity-measuring recessed part formed in the circumferential surface of the rotor, said quantity-measuring recessed part being adapted to separately open into the powder feed part and the powder drop part in succession during the rotation of the rotor, wherein a cleaning gas introducing passage and a cleaning gas discharging passage are provided which are adapted to communicate with the quantity-measuring recessed part while the quantity-measuring recessed part has passed the powder drop part but has not yet opened into the powder feed part.

4. A quantitative powder feeder capable of feeding powder by fixed amounts, which comprises:

an operating shaft capable of rotating on its axis;

a rotor provided integrally with the operating shaft;

a casing having a rotor accommodating part adapted to accommodate the rotor, said rotor accommodating part being provided with an internal circular surface arranged in continuous contact with a circumferential surface of the rotor while permitting sliding rotation of the rotor;

a powder feed part provided in a position of the casing above the rotor, said powder feed part opening downwardly into the rotor accommodating part of the casing;

a powder drop part provided in a position of the casing under the rotor, said powder drop part opening upwardly into the rotor accommodating part; and at least one quantity-measuring recessed part formed in the circumferential surface of the rotor, said quantity-measuring recessed part being adapted to separately open into the powder feed part and the powder drop part in succession during the rotation of the rotor, wherein a pressure regulation passage is provided which is adapted to communicate with the quantity-measuring recessed part while the quantity-measuring recessed part has passed the powder drop part but has not yet opened into the powder feed part.

5. The quantitative powder feeder as claimed in claim 4, wherein the pressure regulation passage is adapted to communicate with the quantity-measuring recessed part while the quantity-measuring recessed part has passed the powder feed part but has not yet opened into the powder drop part.

6. A quantitative powder feeder capable of feeding powder by fixed amounts, which comprises:

an operating shaft capable of rotating on its axis;

a rotor provided integrally with the operating shaft;

a casing having a rotor accommodating part adapted to accommodate the rotor, said rotor accommodating part being provided with an internal circular surface arranged in continuous contact with a circumferential surface of the rotor while permitting sliding rotation of the rotor;

a powder feed part provided in a position of the casing above the rotor, said powder feed part opening downwardly into the rotor accommodating part of the casing;

a powder drop part provided in a position of the casing under the rotor, said powder drop part opening upwardly into the rotor accommodating part; and at least one quantity-measuring recessed part formed in the circumferential surface of the rotor, said quantity-measuring recessed part being adapted to separately open into the powder feed part and the powder drop part in succession during the rotation of the rotor, wherein a pressure regulation passage is provided which is adapted to communicate with the quantity-measuring recessed part while the quantity-measuring recessed part has passed the powder feed part but has not yet opened into the powder drop part.

7. The quantitative powder feeder as claimed in any of claims 6, wherein at least two quantity-measuring recessed parts arranged along a direction of rotation of the rotor are formed in the circumferential surface of the rotor, said quantity-measuring recessed parts each having a substantially hemispherical or substantially semiellipsoidal form.

* * * * *